W. S. TROWBRIDGE.
Transit Instrument.
No. 55,396. 2 Sheets—Sheet 1. Patented June 5, 1866.
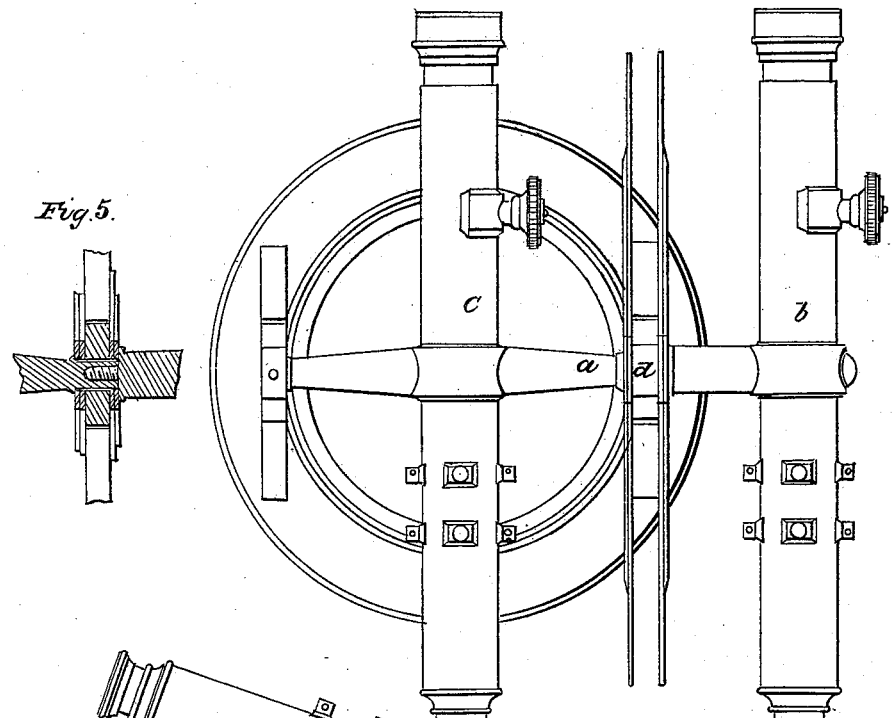
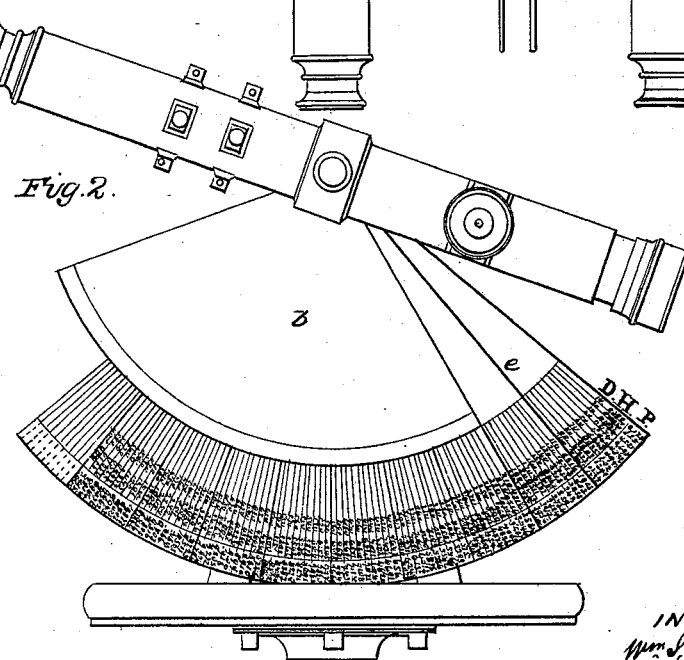

W. S. TROWBRIDGE.
Transit Instrument.

No. 55,396.

2 Sheets--Sheet 2.

Patented June 5, 1866.

WITNESSES
J. Smith
L. C. Jones

INVENTOR
Wm. S. Trowbridge
by Atty Thos. Everett

UNITED STATES PATENT OFFICE.

WILLIAM S. TROWBRIDGE, OF MILWAUKEE, WISCONSIN.

IMPROVEMENT IN TRANSIT-INSTRUMENTS.

Specification forming part of Letters Patent No. 55,396, dated June 5, 1866.

*To all whom it may concern:*

Be it known that I, WILLIAM S. TROWBRIDGE, of the city of Milwaukee, in the State of Wisconsin, have invented a certain new and useful Improvement on Transit-Instruments; and I do hereby declare that the following is a full, clear, and exact description of the same, reference being had to the accompanying drawings, and to the letters and marks thereon.

The drawings forming part of this specification represent a transit-instrument, or so much of the parts thereof as will enable those skilled in the practice and use of such instruments to understand the construction and operation of my improvement.

Figure 3:
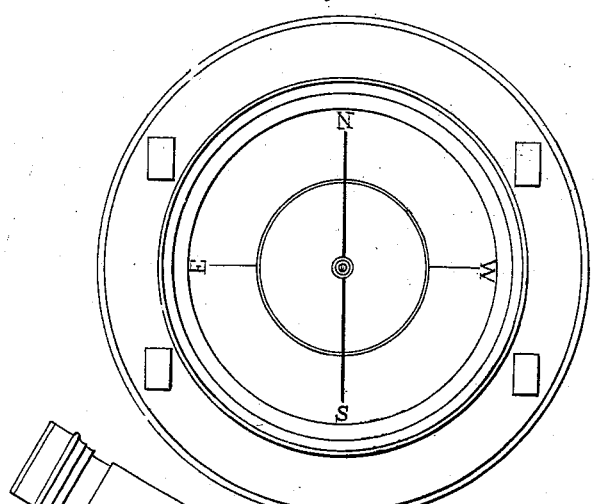
Figure 4:
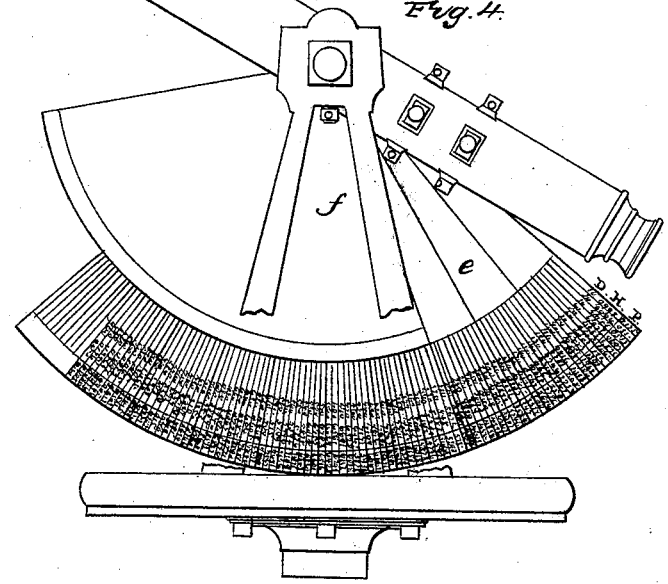

Figure 1 is a top view of an instrument with my improvement; Fig. 2, a view of one side of the instrument; Fig. 3, a view of the face of the instrument; Fig. 4, a view of another side of the instrument, opposite to that shown by Fig. 2, and Fig. 5 is a view of the means of attaching an extra telescope to the shaft of the instrument.

In each of these figures where like parts are shown like marks and letters are used to indicate the parts.

From the several figures of the drawings it will be seen that the shaft *a* of the instrument is extended outward, and has attached to it an extra telescope, *b*, which, as is shown by Fig. 5, is affixed to the end of the shaft by a screw-stem fitting into a recess in the end of the shaft, but which may be connected with the shaft by any other suitable mechanical means or devices, so that the extra telescope may have a greater degree of motion than it can have when attached as shown, and that such motion of this extra telescope may be independent of the motions of the other telescope, *c*, if desirable. When the extra telescope is attached by the means shown, and is screwed up to the end of the shaft, the motions of the shaft carries with it both telescopes.

To one of the standards or uprights *d* of the instrument are affixed two graduated quadrants, *e e*, each having upon its lower surface a table, and to the shaft of the instrument are affixed two other quadrants or plates, *f*, that are moved by and with the shaft.

The letter D on the drawings at the end of these tables indicates the line of degrees marked on the tables, the letter H the figures of the horizontal line, and the letter P the figures of the perpendicular line, the tables being formed on the basis that they represent the two legs of a triangle, the hypotenuse being a unit.

The drawings represent the object-glass of both of the telescopes at the same end of each instrument; but, as is evident, the object-glass of the one instrument may be at the end opposite to that of the other.

The attachment of the extra telescope to the extended portion of the shaft is for the purpose of describing angles from one to ninety degrees, and the attachment of graduated quadrants, with the extra telescope and tables, is for ascertaining the horizontal and perpendicular by taking the angle or surface measurement of slope or incline of ground passed over, the horizontal and perpendicular distance being found by multiplying the figures in the tables on the quadrant by the surface measured for any slope from one to ninety degrees.

What I claim as new, and desire to secure by Letters Patent, is—

1. The attaching of the extra telescope by extending the shaft of the transit-instrument for the purpose of describing angles from one to ninety degrees.

2. The attachment of the graduated quadrants or quadrant on the transit-instrument, in combination with the telescope or telescopes, and the table or tables for ascertaining the horizontal and perpendicular by taking the angle or surface measurement of slope or incline of ground passed over.

This specification signed this 21st day of November, 1865.

WILLIAM S. TROWBRIDGE.

Witnesses:
CHAS. C. RATTINGER,
G. W. MYGATT.